United States Patent
Liu et al.

(10) Patent No.: US 11,460,614 B2
(45) Date of Patent: Oct. 4, 2022

(54) QUANTUM DOT COMPOSITE BRIGHTNESS ENHANCEMENT FILM AND METHOD FOR MANUFACTURING SAME

(71) Applicant: NANJING BREADY ELECTRONICS CO., LTD., Nanjing (CN)

(72) Inventors: Yong Liu, Nanjing (CN); Binbin Xie, Nanjing (CN)

(73) Assignee: NANJING BREADY ELECTRONICS CO., LTD., Nanjing (CN)

( * ) Notice: Subject to any disclaimer, the term of this patent is extended or adjusted under 35 U.S.C. 154(b) by 146 days.

(21) Appl. No.: 16/965,882

(22) PCT Filed: Jun. 16, 2020

(86) PCT No.: PCT/CN2020/096383
§ 371 (c)(1),
(2) Date: Jul. 29, 2020

(87) PCT Pub. No.: WO2020/177787
PCT Pub. Date: Sep. 10, 2020

(65) Prior Publication Data
US 2021/0215858 A1 Jul. 15, 2021

(30) Foreign Application Priority Data
Sep. 27, 2019 (CN) .......................... 201910921187.1

(51) Int. Cl.
*G02B 5/02* (2006.01)
*B32B 7/023* (2019.01)
(Continued)

(52) U.S. Cl.
CPC ............ *G02B 5/0294* (2013.01); *B32B 7/023* (2019.01); *B32B 7/12* (2013.01); *B32B 27/20* (2013.01);
(Continued)

(58) Field of Classification Search
CPC ....... B32B 7/023; B32B 7/12; B32B 2457/20; B32B 27/20; B32B 2260/025;
(Continued)

(56) References Cited

U.S. PATENT DOCUMENTS

| 2002/0003659 A1* | 1/2002 | Marcellin-Dibon | ........................ G02B 5/3066 359/489.08 |
| 2012/0039089 A1* | 2/2012 | Hao | ..................... G02B 5/3041 359/485.05 |
| 2012/0040723 A1* | 2/2012 | Kurihara | ............. H04M 1/0266 455/575.8 |

FOREIGN PATENT DOCUMENTS

| CN | 105259704 A | * | 1/2016 | ............... G02B 1/10 |
| CN | 109459888 A | * | 3/2019 | ........... G02F 1/1336 |

* cited by examiner

*Primary Examiner* — Donald L Raleigh
(74) *Attorney, Agent, or Firm* — Hauptman Ham, LLP

(57) ABSTRACT

The present invention provides a quantum dot composite brightness enhancement film and a method for manufacturing same, relating to the field of optical thin films. The quantum dot composite brightness enhancement film includes a quantum dot film layer formed by a back coating layer, a substrate layer, a first barrier layer, a quantum dot layer, and a second barrier layer which are sequentially attached, a composite brightness enhancement film layer formed by a diffusion layer, a core layer, and a prism layer which are sequentially attached, and an Optically Clear Adhesive (OCA) layer connecting the second barrier layer and the diffusion layer. The quantum dot composite bright-
(Continued)

ness enhancement film of the present invention is configured to be of the multi-layer film structure; the total thickness of the quantum dot composite brightness enhancement film is reduced by omitting one substrate layer, thereby facilitating light-weighting when the quantum dot composite brightness enhancement film is applied to a backlight module; moreover, multiple coating operations on the quantum dot layer are avoided, thereby reducing process defects, and effectively improving the performance of the quantum dot composite brightness enhancement film.

2 Claims, 2 Drawing Sheets

(51) Int. Cl.
*G02F 1/1335* (2006.01)
*B32B 7/12* (2006.01)
*B32B 27/20* (2006.01)
*C09K 11/02* (2006.01)
*C09K 11/56* (2006.01)
*C09K 11/88* (2006.01)
*G02B 5/04* (2006.01)
*B82Y 20/00* (2011.01)
*B82Y 40/00* (2011.01)

(52) U.S. Cl.
CPC .......... *C09K 11/025* (2013.01); *C09K 11/565* (2013.01); *C09K 11/883* (2013.01); *G02B 5/0242* (2013.01); *G02B 5/0278* (2013.01); *G02B 5/045* (2013.01); *G02F 1/133614* (2021.01); *B32B 2260/025* (2013.01); *B32B 2260/046* (2013.01); *B32B 2264/10* (2013.01); *B32B 2457/20* (2013.01); *B82Y 20/00* (2013.01); *B82Y 40/00* (2013.01)

(58) Field of Classification Search
CPC .......... B32B 2260/046; B32B 2264/10; B32B 27/18; G02F 1/133614; G02F 2201/50; G02F 2202/28; G02F 1/1336; G02F 1/133504; G02B 5/0294; G02B 5/0242; G02B 5/0278; G02B 5/045; G02B 5/0221; C09K 11/025; C09K 11/565; C09K 11/883; B82Y 20/00; B82Y 40/00; C08K 9/02
See application file for complete search history.

QUANTUM DOT COMPOSITE BRIGHTNESS ENHANCEMENT FILM AND METHOD FOR MANUFACTURING SAME

RELATED APPLICATIONS

The present application is a National Phase of International Application Number PCT/CN2020/096383, filed Jun. 16, 2020, and claims the priority of China Application No. 201910921187.1, filed Sep. 27, 2019.

TECHNICAL FIELD

The present invention relates to the field of optical thin films, in particular, to a quantum dot composite brightness enhancement film and a method for manufacturing same.

BACKGROUND

Quantum Dots (QDs) are a type of semiconductor nanocrystals, and the energy band structure of quantum dots can be changed by adjusting the size thereof, so that quantum dots can emit light of different wavelengths when excited by light sources. Quantum dot films take advantage of this feature. Under blue backlight, red and green quantum dots in a quantum dot film are excited to emit red and green light, which is mixed with unconverted blue light to form white light. Compared with a conventional LCD display, an LCD display using a quantum dot film only has the backlight source replaced with a blue backlight source, and has little changes in the other structures, but the color gamut can be increased from 70% NTSC1931 to 110% or more.

A composite brightness enhancement film is a composite of multiple optical films. Compared with a conventional optical film, the composite brightness enhancement film has lower thickness, lower cost, higher assembly efficiency, and higher brightness, and greatly reduces the problems of scratches and scrapes caused by friction between films. The composite brightness enhancement film includes two film structures, one is a composite film of a diffusion layer plus a core layer plus a prism layer (COP), and the other is a multilayer composite film of a diffusion layer plus a core layer plus a prism layer plus a prism layer (COPP). The core layers are both 3M core layers.

A quantum dot composite brightness enhancement film is formed of compositing a quantum dot film and a composite brightness enhancement film. In this way, the wide color gamut effect of the quantum dot film can be organically combined with the diffusion and brightness enhancement effect of the composite brightness enhancement film. The use of such a composite film can reduce the thickness of the entire module, simplify the installation difficulty of the module, and facilitate the development of subsequent ultra-thin display products.

A multifunctional quantum dot film as disclosed in patent application CN201710270818.9 in the prior art includes a quantum dot layer, upper and lower barrier layers respectively provided on both sides of the quantum dot layer, a prism layer provided on the upper barrier layer, and a light diffusion layer provided on the lower barrier layer; the quantum dot layer is formed of a resin, a monomer, a photoinitiator, scattering particles, red quantum dots, and green quantum dots; and the light diffusion layer is formed of organic polymer particles and a thermosetting resin. This patent sets out to add a brightness enhancement function and a diffusion function to the quantum dot film to replace the lower diffusion film and the lower brightness enhancement film in a conventional backlight module, but there are some obvious shortcomings in the above method, including: (1) multiple coating operations are performed on the same quantum dot film, greatly increasing process defects and reducing the production yield; (2) the process is complex, making it easy to produce defects; and (3) in addition to the curing of the quantum dot adhesive, it is also necessary to cure adhesives twice on the surfaces of the quantum dot film, which makes it difficult to ensure the entire film not to be deformed under the action of external forces.

SUMMARY

The object of the present invention is to provide a quantum dot composite brightness enhancement film and a method for manufacturing same. The operation is simple, and there is no need to perform multiple coating operations on the quantum dot layer, thereby reducing process defects and improving the performance of the quantum dot composite brightness enhancement film.

To achieve the above object, the present invention provides the following technical solution: a quantum dot composite brightness enhancement film, configured to be of a multilayer structure consisting of a quantum dot film layer, a composite brightness enhancement film layer, and an Optically Clear Adhesive (OCA) layer, where the quantum dot film layer includes a back coating layer, a substrate layer, a first barrier layer, a quantum dot layer, and a second barrier layer which are sequentially attached, and the first barrier layer and the second barrier layer are moisture-oxygen barrier films; the composite brightness enhancement film layer includes a diffusion layer, a core layer, and a prism layer which are sequentially in contact; and the OCA layer is disposed between the quantum dot film layer and the composite brightness enhancement film layer, one side of the OCA layer is attached to and contacts the second barrier layer of the quantum dot film layer, and the opposite side of the OCA layer is attached to the diffusion layer of the composite brightness enhancement film layer.

Further, the quantum dot layer is an adhesive system formed by mixing a matrix resin, quantum dots, a quantum dot stabilizer, scattering particles, an initiator, and a diluent; the matrix resin is one or more of a silicone resin, an epoxy resin, a polyacrylamide, a polyurethane, an isocyanate, a photocurable resin, and a thermosetting resin; the quantum dots are of a core-shell structure formed of a semiconductor material, which includes a quantum dot central core and an outer shell; the quantum dot central core is formed of scattering particles, and the outer shell is formed of quantum dot nanoparticles; the scattering particles are inorganic particles and/or organic particles, the inorganic particles are one or more of nano-silicon dioxide, nano-titanium dioxide, nano-calcium dioxide, and nano-zirconium dioxide, and the organic particles are silicone nanoparticles and/or acrylate nanoparticles; the quantum dot nanoparticles are one or more of MgS, CdTe, CdSe, CdS, CdZnS, ZnSe, ZnTe, ZnS, ZnO, GaAs, GaN, GaP, InP, InAs, InN, InSb, AlP, and AlSb; the quantum dot stabilizer is one or more of toluene, n-hexane, chloroform, and isobornyl acrylate; the initiator is a photoinitiator and/or a thermal initiator; and the diluent is one or more of toluene, acetone, butanone, acetonitrile, ethanol, acetic acid, ethyl acetate, butyl acetate, and n-butyl ether.

Because quantum dots are prone to quenching, the quantum dots are encapsulated by the adhesive system formed by the matrix resin and the quantum dots; moreover, moisture-oxygen barrier films are used as the barrier layers to further protect the quantum dot adhesive system, thereby reducing quenching of the quantum dots.

Further, in the quantum dot film layer, the back coating layer has a thickness of 5-10 μm, the substrate layer has a thickness of 45-115 μm, and the quantum dot layer has a thickness of 50-100 μm. While ensuring the optical performance of the quantum dot film layer, adjusting the thicknesses of the back coating layer, the substrate layer and the quantum dot layer facilitates light-weighting of the quantum dot composite brightness enhancement film.

Further, the diffusion layer, the core layer, and the prism layer of the composite brightness enhancement film layer are attached by an ultraviolet curing adhesive through curing, and the thickness of the ultraviolet curing adhesive is 5-10 μm.

Further, the diffusion layer is used for correcting a light diffusion angle, and has a thickness of 50-100 μm; the core layer is a 3M brightness enhancement polarizing film with a thickness of 20-50 μm; and the prism layer is used for increasing the recycling of backlight, and has a thickness of 50-200 μm.

Further, the composite brightness enhancement film layer includes two prism layers attached by the ultraviolet curing adhesive, which is beneficial to concentrating as much scattered light as possible within a range of 70° of the normal to emit light, and improving the brightness of a display.

The present invention further discloses a method for manufacturing a quantum dot composite brightness enhancement film, specifically including the following steps:

(1) dissolving quantum dots in a quantum dot stabilizer to obtain a quantum dot solution; mixing the quantum dot solution with a matrix resin, scattering particles, an initiator, and a diluent, then separately attaching same to a first barrier layer with one side attached to a substrate layer at the upper layer and a second barrier layer at the lower layer by means of slit coating, and curing the quantum dot layer therebetween under the action of illumination and heating to prepare a quantum dot film layer;

(2) sequentially attaching a diffusion layer, a core layer, and a prism layer by an ultraviolet curing adhesive through curing to prepare a composite brightness enhancement film layer, where one or two prism layers are provided according to actual production needs; and (3) attaching the second barrier layer side of the quantum dot film layer to the diffusion layer of the composite brightness enhancement film layer by an OCA to prepare a quantum dot composite brightness enhancement film.

It can be known from the above technical solutions that the quantum dot composite brightness enhancement film and the method for manufacturing same provided by the technical solutions of the present invention achieve the following beneficial effects.

According to the quantum dot composite brightness enhancement film and the method for manufacturing same disclosed by the present invention, the quantum dot composite brightness enhancement film is configured to be of a multilayer structure formed by sequentially attaching a quantum dot film layer, an OCA layer, and a composite brightness enhancement film layer; the quantum dot film layer includes a back coating layer, a substrate layer, a first barrier layer, a quantum dot layer, and a second barrier layer which are sequentially attached, and the composite brightness enhancement film layer includes a diffusion layer, a core layer, and a prism layer which are sequentially in contact. The quantum dot composite brightness enhance-ment film in the present invention is of a multilayer film structure, one substrate layer is omitted from the quantum dot film, the total thickness of the quantum dot composite brightness enhancement film is reduced, thereby facilitating light-weighting when the quantum dot composite brightness enhancement film is applied to a backlight module. The quantum dot layer is an adhesive system consisting of a matrix resin, and is directly applied between the first barrier layer and the second barrier layer formed of moisture-oxygen barrier films, thereby reducing the quenching of quantum dots and protecting the quantum dot layer; the need to perform multiple coating operations on the same quantum dot layer is directly avoided, thereby reducing the possibility of warpage deformation of the film, reducing process defects, and improving the performance of the quantum dot composite brightness enhancement film; the module assembly time and the scratches and scrapes between films are reduced; moreover, the quantum dot film layer is directly cured under the conditions of illumination and heating, the process is simple, and the operation is convenient.

In addition, the solution of using an OCA layer to connect the quantum dot film layer and the composite brightness enhancement film layer and providing at least one prism layer on the outermost side of the quantum dot film layer away from the back coating layer concentrates as much scattered light as possible within a range of 70° of the normal to emit light, thereby greatly improving the brightness of a display when the quantum dot composite brightness enhancement film is applied to the display.

BRIEF DESCRIPTION OF THE DRAWINGS

To describe the technical solutions in embodiments of the present invention more clearly, the accompanying drawings required for describing the embodiments are briefly introduced below. Apparently, the accompanying drawings in the following description show merely some embodiments of the present invention, and a person of ordinary skill in the art can still derive other accompanying drawings from these accompanying drawings without exceeding the scope of protection of the present invention.

Figure 1:
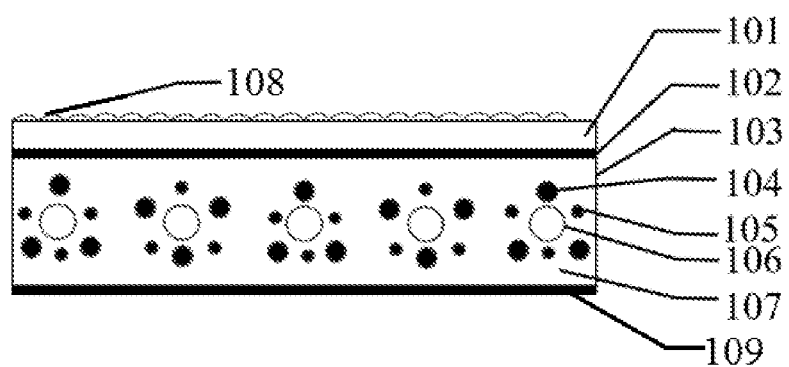
FIG. 1 is a schematic diagram of a quantum dot film according to the present invention.

In the accompanying drawings, the specific meanings of the reference numerals are as follows:

101—substrate layer, 102—first barrier layer, 103—quantum dot layer, 104—green quantum dot, 105—red quantum dot, 106—scattering particle, 107—matrix resin, 108—back coating layer, 109—second barrier layer, 201—diffusion layer, 202—core layer, 203—prism layer, 204—ultraviolet curing adhesive layer, 301—OCA layer.

DETAILED DESCRIPTION

The technical solutions in embodiments of the present invention are clearly and fully described below with reference to the accompanying drawings in the embodiments of the present invention. Apparently, the described embodiments are merely some of the embodiments of the present invention, but not all the embodiments. Based on the embodiments of the present invention, all other embodiments obtained by a person skilled in the art without involving an inventive effort shall fall within the scope of protection of the present invention.

In the prior art, when manufacturing a multifunctional quantum dot film, the process is generally complex, and usually, multiple coating operations and multiple adhesive curing operations on the same quantum dot film are required, which greatly increases process defects and reducing the film production yield. The present invention is to provide a quantum dot composite brightness enhancement film and a method for manufacturing same. The process is simple. The quantum dot composite brightness enhancement film is configured to be of a multilayer structure, and a quantum dot layer 103 constituting an adhesive system is applied between a first barrier layer 102 and a second barrier layer 109, thereby directly avoiding multiple coating operations and multiple adhesive curing operations on the same quantum dot film and reducing process defects. Moreover, when the quantum dot film and the composite brightness enhancement film are attached and assembled, light-weighting can be achieved by adjusting the thicknesses of the film layers and omitting one substrate layer 101.

The quantum dot composite brightness enhancement film and the method for manufacturing same in the present invention will be further specifically described below with reference to the embodiments shown in the accompanying drawings.

Figure 3:
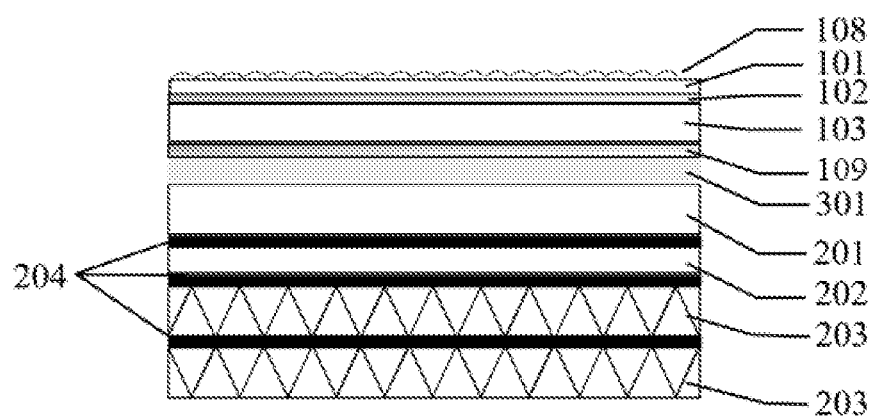
FIG. 3 is a schematic diagram of a quantum dot composite brightness enhancement film according to the present invention.

Referring to FIG. 3, provided is a quantum dot composite brightness enhancement film, configured to be of a multilayer structure consisting of a quantum dot film layer, a composite brightness enhancement film layer, and an OCA layer 301, where the quantum dot film layer includes a back coating layer 108, a substrate layer 101, a first barrier layer 102, a quantum dot layer 103, and a second barrier layer 109 which are sequentially attached, and the first barrier layer 102 and the second barrier layer 109 are moisture-oxygen barrier films; the composite brightness enhancement film layer includes a diffusion layer 201, a core layer 202, and a prism layer 203 which are sequentially in contact; and the OCA layer 301 is disposed between the quantum dot film layer and the composite brightness enhancement film layer, one side of the OCA layer 301 is attached to and contacts the second barrier layer 109 of the quantum dot film layer, and the opposite side of the OCA layer 301 is attached to the diffusion layer 201 of the composite brightness enhancement film layer.

Referring to FIG. 1, the quantum dot layer 103 is an adhesive system formed by mixing a matrix resin 107, quantum dots, a quantum dot stabilizer, scattering particles 106, an initiator, and a diluent. The quantum dots include green quantum dots 104 and red quantum dots 105. The quantum dots are encapsulated through the adhesive system formed by the matrix resin 107 and the quantum dots, so that the quantum dots can be protected by encapsulation, thereby reducing quenching of the quantum dots.

In the embodiments, the quantum dots are of a core-shell structure formed of a semiconductor material, which includes a quantum dot central core and an outer shell. The quantum dots are one or more of MgS, CdTe, CdSe, CdS, CdZnS, ZnSe, ZnTe, ZnS, ZnO, GaAs, GaN, GaP, InP, InAs, InN, InSb, AlP, and AlSb, for example, the central core is a CdSe core, and the shell is a ZnS shell. Due to the difference in the size of quantum dots, which is generally 2-10 nm, the wavelength of light emitted by quantum dots varies with the particle size and composition. Generally speaking, the quantum dots include green quantum dots 104 and red quantum dots 105, the particle size of the green quantum dots 104 is small, and the particle size of the red quantum dots 105 is large. During specific implementation, the scattering particles 106 may be inorganic particles and/or organic particles, the inorganic particles are generally one or more of nano-silicon dioxide, nano-titanium dioxide, nano-calcium dioxide, and nano-zirconium dioxide, and the organic particles are silicone nanoparticles and/or acrylate nanoparticles.

To form the adhesive system that encapsulates the quantum dots, the matrix resin 107 may be one or more of a silicone resin, an epoxy resin, a polyacrylamide, a polyurethane, an isocyanate, a photocurable resin, and a thermosetting resin; the quantum dot stabilizer is one or more of toluene, n-hexane, chloroform, and isobornyl acrylate; the initiator is a photoinitiator and/or a thermal initiator; and the diluent is one or more of toluene, acetone, butanone, acetonitrile, ethanol, acetic acid, ethyl acetate, butyl acetate, and n-butyl ether.

Moreover, the first barrier layer 102 and the second barrier layer 109 in the present invention are moisture-oxygen barrier films, so as to further protect the quantum dot layer 103 adhesive system, reduce quenching of the quantum dots, and improve the performance of the quantum dot film layer.

Figure 2:
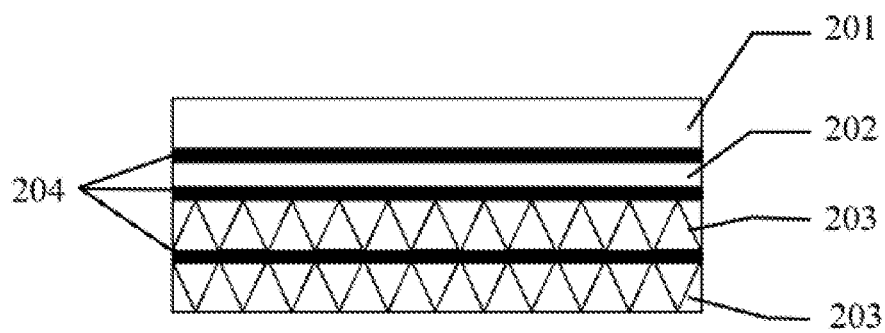
FIG. 2 is a schematic diagram of a composite brightness enhancement film according to the present invention.

Referring to FIG. 2, the diffusion layer 201, the core layer 202, and the prism layer 203 of the composite brightness enhancement film layer are attached by an ultraviolet curing adhesive 204 through curing. In addition, in order to improve the brightness enhancement effect of the quantum dot composite brightness enhancement film, the composite brightness enhancement film layer may be provided with one or two prism layers 203, and the two prism layers 203 are connected and fixed by the ultraviolet curing adhesive 204. Generally, during specific operation, the application thickness of the ultraviolet curing adhesive is 5-10 μm. In the present invention, disposing the prism layer 203 on the side far away from the quantum dot film layer is beneficial to concentrating as much scattered light as possible within a range of 70° of the normal to emit light and increasing the recycling of backlight, thereby greatly improving the brightness when the quantum dot composite brightness enhancement film is applied to a display.

Further referring to FIGS. 1 and 2, in order to improve the light-weighting of the quantum dot composite brightness enhancement film during application and the performance and quality of the product, the back coating layer 108 of the quantum dot film layer is surface roughened to avoid scratching and scraping the quantum dot film layer, and has a thickness of 5-10 μm; the substrate layer 101 is made of Polyethylene Terephthalate (PET), and has a thickness of 45-115 μm; the quantum dot layer 103 adhesive system has a thickness of 50-100 μm; the diffusion layer 201 in the composite brightness enhancement film layer is used for correcting a light diffusion angle, covering the defect of a light guide plate, and making a backlight source to achieve larger radiation area and more uniform radiation, and has a thickness of 50-100 μm; the core layer 202 is a 3M brightness enhancement polarizing film with a thickness of 20-50 μm; and the prism layer 203 is used for increasing the recycling of backlight, making scattered light reflected back and reused, and increasing the brightness at the axis center to 110% or more, and has a thickness of 50-200 μm. While ensuring the optical performance of the quantum dot film layer, adjusting the thicknesses of the layer structures, i.e., adjusting the thicknesses of the back coating layer 108, the substrate layer 101, the quantum dot layer 103, the diffusion layer 201, the core layer 202, and the prism layer 103, facilitates light-weighting and performance adjustment of the quantum dot composite brightness enhancing film.

In order to solve the above technical problems of complex process, process defects, and low production yield in quantum dot film layer manufacturing, the present invention further discloses a method for manufacturing a quantum dot composite brightness enhancement film with simple operation and a simple process, specifically including the following steps:

(1) dissolving quantum dots in a quantum dot stabilizer to obtain a quantum dot solution; mixing the quantum dot solution with a matrix resin 107, scattering particles 106, an initiator, and a diluent, then separately attaching same to a first barrier layer 102 with one side attached to a substrate layer 101 at the upper layer and a second barrier layer 109 at the lower layer by means of slit coating, and curing the quantum dot layer 103 therebetween under the action of illumination and heating to prepare a quantum dot film layer; (2) sequentially attaching a diffusion layer 201, a core layer 202, and a prism layer 203 by an ultraviolet curing adhesive layers 204 through curing to prepare a composite brightness enhancement film layer, where one or two prism layers 203 are provided according to actual production needs; and (3) attaching the second barrier layer 109 side of the quantum dot film layer to the diffusion layer 201 of the composite brightness enhancement film layer by an OCA 301 to prepare a quantum dot composite brightness enhancement film.

Performance tests of the manufactured quantum dot composite brightness enhancement film are used to illustrate the influence of the number of the prism layers 203 on the performance of the quantum dot composite brightness enhancement film in conjunction with specific embodiments below, and the results are as shown in table 1.

Embodiment 1

First, a quantum dot film layer is prepared: dissolving quantum dots in a quantum dot stabilizer to obtain a quantum dot solution; mixing the quantum dot solution with a matrix resin 107, scattering particles 106, an initiator, and a diluent, then attaching same to a first barrier layer 102 having a PET layer at the upper layer and a second barrier layer 109 at the lower layer by means of slit coating, and curing the quantum dot layer 103 therebetween under the action of illumination and heating to prepare a quantum dot film layer; and then rolling same into a roll. Then, a composite brightness enhancement film layer is prepared: sequentially attaching a diffusion layer 201, a core layer 202, and a prism layer 203 by an ultraviolet curing adhesive (UV adhesive) through curing, with the thickness of the UV adhesive being 5-10 µm during attachment, to prepare a composite brightness enhancement film, and then rolling same into a roll, where in the embodiment, the composite brightness enhancement film is provided with only one prism layer 203. Finally, the second barrier layer 109 of the quantum dot film layer is attached to the diffusion layer 201 of the composite brightness enhancement film layer by an OCA to prepare a quantum dot composite brightness enhancement film, where the OCA forms an OCA layer 301 between the quantum dot film layer and the composite brightness enhancement film layer.

Embodiment 2

Embodiment 2 differs from embodiment 1 in that: the prepared composite brightness enhancement film layer is provided with two prism layers 203 on the side of the core layer 202 away from the diffusion layer 201, and the two prism layers 203 are attached by the UV adhesive through curing. The other manufacturing procedures of the quantum dot composite brightness enhancement film remain unchanged.

Compared with embodiment 1, the brightness of the quantum dot composite brightness enhancement film is increased by 5.3% after providing one more prism layer in embodiment 2.

TABLE 1

Performance comparison table of quantum dot composite brightness enhancement film

| Embodiment | Difference | Brightness (cd/m$^2$) |
|---|---|---|
| Embodiment 1 | One prism layer | 4318 |
| Embodiment 2 | Two prism layers | 4549 |

According to the quantum dot composite brightness enhancement film disclosed by the present invention, the quantum dot composite brightness enhancement film is configured to be of a multilayer structure, there is no need to perform multiple coating operations on the quantum dot film layer, and the total thickness of the quantum dot composite brightness enhancement film is reduced by omitting one substrate layer from the quantum dot film and adjusting the thicknesses of the layer structures, thereby facilitating light-weighting when the quantum dot composite brightness enhancement film is applied to a backlight module and improving the product performance. Moreover, the present invention also reduces warpage deformation of the film by reducing the number of adhesive curing processes during manufacturing of the quantum dot composite brightness enhancement film, thereby greatly reducing process defects. In addition, the method for manufacturing a quantum dot composite brightness enhancement film in the present invention is simple in process and convenient in operation, and can greatly reduce the module assembly time, the module installation time, and the scratches and scrapes between films.

The embodiments of the present invention are described in detail above, and specific examples are used to explain principles and implementations of the present invention. The descriptions of the embodiments are only used to help understand the method and the core idea of the present invention. In addition, for a person skilled in the art, according to the idea of the present invention, any changes or modifications based on the specific implementations of the present invention and the scope of application above are within the scope of protection of the present invention. In conclusion, the content of this description should not be understood as limiting the present invention.

The invention claimed is:

1. A method for manufacturing a quantum dot composite brightness enhancement film, comprising the following steps:

(1) selecting quantum dots according to performance requirements for a quantum dot composite brightness enhancement film to be manufactured and dissolving the quantum dots in a quantum dot stabilizer to obtain a quantum dot solution; uniformly mixing the quantum dot solution with a matrix resin, scattering particles, an initiator, and a diluent, then separately attaching same to a first barrier layer with one side attached to a substrate layer at the upper layer and a second barrier layer at the lower layer by means of slit coating, and curing the quantum dot layer between the first barrier layer and the second barrier layer under the action of illumination and heating to prepare a quantum dot film layer;

(2) sequentially attaching a diffusion layer, a core layer, and a prism layer by an ultraviolet curing adhesive through curing to prepare a composite brightness enhancement film layer; and (3) attaching the second barrier layer side of the quantum dot film layer to the diffusion layer of the composite brightness enhancement film layer by an Optically Clear Adhesive (OCA) to prepare a quantum dot composite brightness enhancement film.

2. The method for manufacturing a quantum dot composite brightness enhancement film according to claim 1, wherein the composite brightness enhancement film layer is provided with one or two prism layers, and the two prism layers are attached by the ultraviolet curing adhesive through curing.

\* \* \* \* \*